United States Patent [19]

Akaike et al.

[11] Patent Number: 4,730,714

[45] Date of Patent: Mar. 15, 1988

[54] DRIVE SYSTEM FOR SELF-PROPELLED MACHINE

[75] Inventors: Junichi Akaike, Chofu; Masatoshi Satoh, Tokyo, both of Japan

[73] Assignee: Kioritz Corporation, Tokyo, Japan

[21] Appl. No.: 896,016

[22] Filed: Aug. 13, 1986

[30] Foreign Application Priority Data

Sep. 5, 1985 [JP] Japan .......................... 60-135108[U]

[51] Int. Cl.$^4$ .............................................. F16D 13/40
[52] U.S. Cl. .................................. 192/89 R; 192/66; 192/101; 188/72.3; 188/216
[58] Field of Search .............. 192/66, 70.2 B, 85 A, 192/85 C, 89 R, 89 B, 99 S, 101; 188/72.3, 216

[56] References Cited

U.S. PATENT DOCUMENTS

| | | | |
|---|---|---|---|
| 1,577,496 | 3/1926 | Sholberg | 192/66 |
| 2,055,233 | 9/1936 | Holmes | 192/99 S |
| 2,167,450 | 7/1939 | Ginsburg | 192/66 |
| 3,390,749 | 7/1968 | Pospisil et al. | 192/66 |
| 3,662,570 | 5/1972 | Chinlund et al. | 192/89 B |
| 3,822,772 | 7/1974 | Murakami | 192/70.28 |
| 4,425,993 | 1/1984 | Schilling | 192/85 A |

Primary Examiner—Rodney H. Bonck
Assistant Examiner—David A. Testardi
Attorney, Agent, or Firm—Browdy and Neimark

[57] ABSTRACT

A drive system for a self-propelled machine including a drive-side main body supporting a pressure contact disc, and a driven-side main body supporting a clutch disc. One of the drive-side main body and driven-side main body is secured to a machine body, and the other main body is connected to the machine body through springs while being movable in floating movement with respect to the machine body, whereby the two discs can be brought into and out of contact with each other.

7 Claims, 1 Drawing Figure

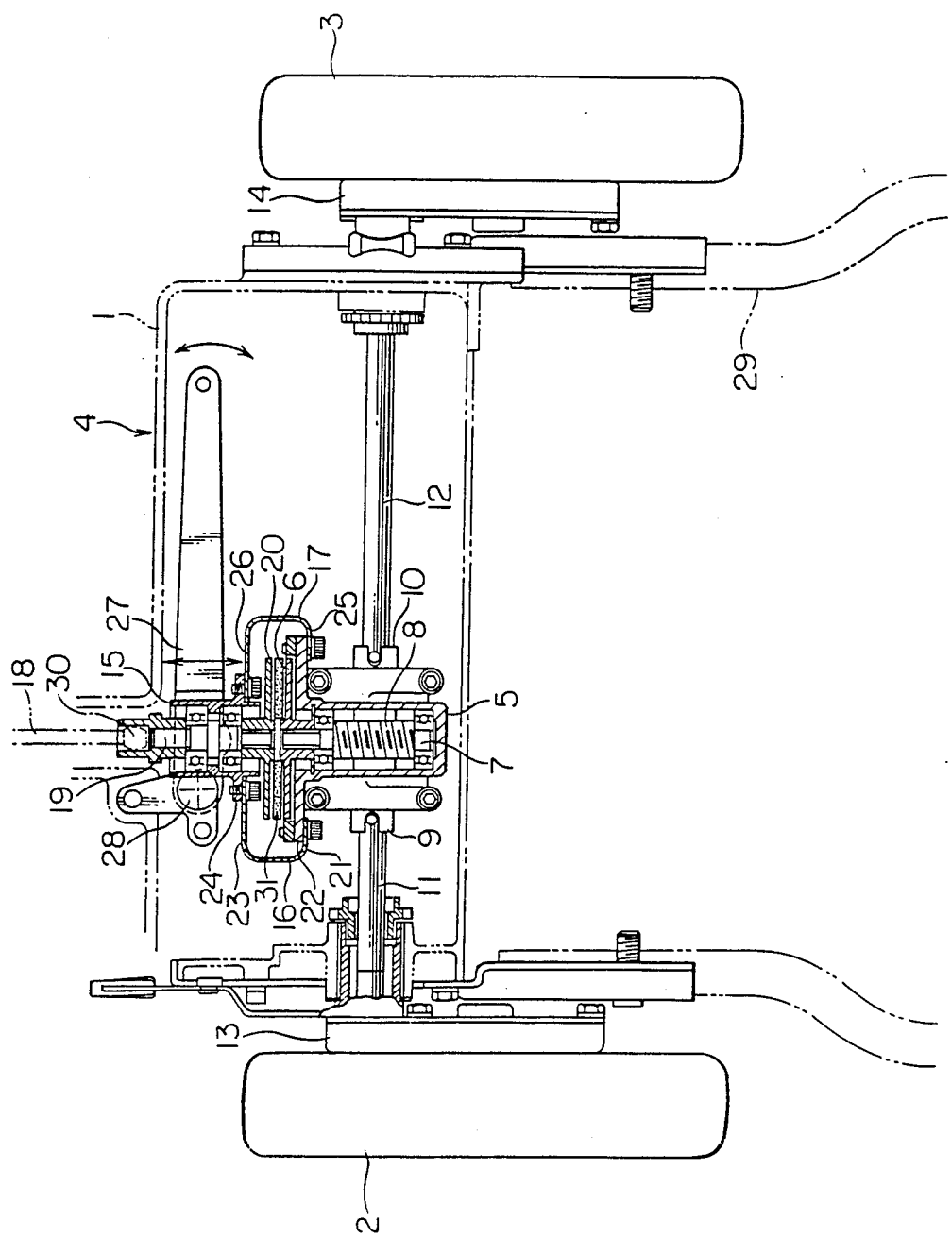

DRIVE SYSTEM FOR SELF-PROPELLED MACHINE

BACKGROUND OF THE INVENTION

1. Field of the Invention

This invention relates to a drive system for a self-propelled machine, such as a grass cutting machine, an agricultural machine, etc., which is equipped with a prime mover as a power source.

2. Description of the Prior Art

The drive systems of the prior art for the type of machines referred to hereinabove are generally designed to transmit motive force from the prime mover to the wheels through clutch means to drive the machine for operation. The clutch means has hitherto comprised a belt tension clutch, a dog clutch, a rubber roller clutch, etc. The problems encountered in the clutch means of the prior art include a rather short service life of the component parts of the clutch, the difficulty with which a smooth, engine startup is achieved and the complex construction which makes maintenance and repair a time-consuming operation.

SUMMARY OF THE INVENTION

This invention has been developed for the purpose of obviating the aforesaid problems of the prior art. Accordingly, the invention has as its object the provision of a drive system for a self-propelled machine which is simple in construction and positive in operation.

The outstanding characteristic of the invention enabling the aforesaid object to be accomplished is that, in a drive system for a self propelled machine comprising a prime mover mounted on a machine body and clutch means for transmitting motive force from the prime mover to wheels for propelling the machine to perform an operation, the clutch means comprises a drive-side main body rotatably supporting a pressure contact disc drivenly connected to the prime mover, a driven-side main body rotatably supporting a clutch disc drivingly connected to the wheels located in axial alignment with the pressure contact disc to allow the latter to move into and out of contact with the former, one of the drive-side main body and driven-side main body being secured to the machine body, and resilient means for connecting the other main body therethrough to the one main body whereby the other main body can move in floating movement with respect to the machine body to bring the two discs into and out of contact with each other.

The aforesaid outstanding characteristic of the invention enables the drive-side main body and driven-side main body to be connected to each other through the resilient means exerting a biasing force which is concerned in the movement of the two discs into and out of contact with each other to engage and disengage the clutch. This is conducive to smooth operation of the clutch means. In the drive system according to the invention, the number of frictional and sliding parts is minimized, so that the system has a prolonged service life. The clutch means shows an excellent performance, and the machine can start smoothly. The drive system is simple in construction, high in reliability and easy to maintain and repair. It can have application in a wide range of machines, including a lawn mowing machine, an agricultural machine, etc.

BRIEF DESCRIPTION OF THE DRAWING

The single drawing is a plan view, with certain parts being cut away, of the essential portions of a lawn mowing machine in which one embodiment of the drive system in conformity with the invention can be incorporated.

DESCRIPTION OF THE PREFERRED EMBODIMENT

A preferred embodiment will now be described. The embodiment shown in the single drawing comprises, as clutch means, a deadman control clutch of a self-propelled lawn mower in which the invention is incorporated. The lawn mower comprises a machine body 1 which supports a prime mover, such as a gasoline engine, not shown, and a drive system, presently to be described for transmitting motive force from the prime mover to rear wheels 2 and 3 to drive same for travel.

The drive system of this embodiment comprises clutch means generally designated by the reference numeral 4 including a driven-side main body 5 and a drive-side main body 15. The driven-side main body 5 supports for rotation a driven shaft 7 having a clutch disc 6 secured to its forward end. The shaft 7 is connected to the rear wheels 2 and 3 through worm gearing 8, bayonet joints 9 and 10, axles 11 and 12 and final reduction gearing 13 and 14, to simultaneously drive the rear wheels 2 and 3 for rotation.

The drive-side main body 15 of the clutch means 4 is supported by the driven-side main body 5 through a pair of U-shaped plate springs 16 and 17 for floating movement with respect to the machine body 1. The drive-side main body 15 supports for rotation and relative axial sliding movement a drive shaft 18 which is drivenly connected to an output shaft of the prime mover. The drive-side main body 15 further supports for rotation a clutch drive shaft 19 which is connected at its inner end to the drive shaft 18 through a sliding joint 30. The clutch drive shaft 19 which is axially aligned with the driven shaft 7 has secured to its outer end a pressure contact disc 20 movable into and out of contact with the clutch disc 6.

The one plate spring 16 is secured at one end 21 thereof to a flange 22 of the driven-side main body 5 and at an opposite end 23 thereof to a flange 24 of the drive-side main body 15 in a manner to surround the two discs 6 and 20 at one side portion thereof, and the other plate spring 17 is secured at ends 25 and 26 thereof to the flanges 22 and 24 respectively in a manner to surround the discs 6 and 20 at an opposite side portion thereof. The plate springs 16 and 17 normally hold by their biasing forces the drive-side main body 15 in a position in which the pressure contact disc 20 is axially moved away from the clutch disc 6 to bring the clutch means to a disengaged position.

A lever member 27 which is pivotally supported at one end thereof by the machine body 1 through a pin 28 is positioned at an intermediate portion thereof against the drive-side main body 15 so as to move the drive-side main, body 15 axially as the lever member 27 pivotally moves. The lever member 27 is connected through cables, not shown, to an operation lever, not shown, supported at a rear end of handle bars 29. As the operator grips the operation lever and moves the lever member 27 clockwise in the drawing in pivotal movement through the cables, the drive-side main body 15 moves axially toward the driven-side main body 5 against the biasing forces of the plate springs 16 and 17, to bring the pressure contact disc 20 into pressing contact with the clutch disc 6. This allows rotation to be transmitted from the drive shaft 18 to the driven shaft 7, to thereby rotate the rear wheels 2 and 3. As the operator releases the operation lever, the biasing forces of the plate springs 16 and 17 urge the drive-side main body 15 to move away from the driven-side main body 5 to bring the pressure contact disc 20 out of contact with the clutch disc 6, thereby blocking the transmission of motive force to the rear wheels 2 and 3. This drive system is suitable for maintaining the clutch in a semi-engaged position because fine adjustments of the semi-engaged condition of the clutch can be effected by changing the manner in which the operation lever is gripped.

In the embodiment shown and described hereinabove, the driven-side main body 5 is immovably secured to the machine body 1 and the drive-side main body 15 is axially movable relative to the driven-side main body 5. The invention is not limited to this arrangement and the drive-side main body 15 may be immovably secured to the machine body 1 while the driven-side main body 5 is mounted for axial movement relative to the drive-side main body 15, so that the driven-side main body 5 can be moved through the operation lever to engage and disengage the clutch. The clutch disc 6 includes a clutch facing 31 which may be secured to the clutch disc 6. In the illustrated embodiment, the clutch facing 31 is floatingly supported by the two discs 6 and 20 at their center bosses. This arrangement permits the facing 31 to be readily replaced, when necessary, by a new one merely by moving the drive-side main body 15 away from the driven-side main body 5 by a distance slightly greater than the distance by which the former is moved away from the latter when the clutch is to be disengaged.

What is claimed is:

1. A drive system for a self-propelled machine comprising:

a prime mover mounted on a machine body having wheels;

clutch means for transmitting motive force from the prime mover to respective ones of said wheels for driving the machine to perform an operation;

wherein said clutch means comprises a drive-side main body rotatably supporting a pressure contact disc drivenly connected to the prime mover, a driven-side main body rotatably supporting a clutch disc drivenly connected to the wheels located in axial alignment with the pressure contact disc to allow the latter disc to move into and out of contact with the former disc, one of said drive-side main body and driven-side main body being secured to the machine body, and resilient means extending substantially around said two discs for connecting the other main body there through to the one main body whereby the other main body can move in floating movement with respect to the machine body to bring the two discs into and out of contact with each other.

2. A drive system as claimed in claim 1, wherein said resilient means comprises a pair of U-shaped plate springs, said plate springs being located in transversely juxtaposed relation in a manner to surround said two discs and secured at their ends to the drive-side main body and the driven-side main body.

3. A drive system as claimed in claim 1, wherein said resilient means has a biasing force enabling the clutch means to be kept in a disengaged position.

4. The system of claim 2, each said U-shaped plate spring surrounding said pressure contact and clutch discs at one side portion thereof.

5. The system of claim 3, wherein said resilient means comprises a pair of U-shaped plate springs, said plate springs being located in transversely juxtaposed relation in a manner to surround said two discs and secured at their ends to the drive-side main body and the driven-side main body.

6. The system of claim 3, said resilient means comprising respective plural parts surrounding said two discs at respective sides of said two discs.

7. The system of claim 6, each said part of said resilient means being a respective U-shaped plate spring attached at respective ends to said two main bodies.

* * * * *